(12) United States Patent
Oshita et al.

(10) Patent No.: US 11,175,636 B2
(45) Date of Patent: Nov. 16, 2021

(54) SATELLITE RADIO WAVE RECEIVING DEVICE, ELECTRONIC TIMEPIECE, METHOD, AND NON-TRANSITORY COMPUTER-READABLE STORAGE MEDIUM

(71) Applicant: CASIO COMPUTER CO., LTD., Tokyo (JP)

(72) Inventors: Yuki Oshita, Tokyo (JP); Mototaka Minakuchi, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 335 days.

(21) Appl. No.: 16/294,112

(22) Filed: Mar. 6, 2019

(65) Prior Publication Data

US 2019/0278233 A1    Sep. 12, 2019

(30) Foreign Application Priority Data

Mar. 7, 2018    (JP) .............................. JP2018-040317

(51) Int. Cl.
 *G04R 20/04* (2013.01)
 *G01S 19/31* (2010.01)
 *G01S 19/14* (2010.01)

(52) U.S. Cl.
 CPC .............. *G04R 20/04* (2013.01); *G01S 19/14* (2013.01); *G01S 19/31* (2013.01)

(58) Field of Classification Search
 CPC .......... G01S 19/14; G01S 19/31; G01S 19/34; G01S 19/35; G01S 5/0027; G01S 2205/002; G04R 20/04

(Continued)

(56) References Cited

U.S. PATENT DOCUMENTS 6,426,719 B1    7/2002 Nagareda et al.
2012/0223860 A1*    9/2012 Leclercq ................. G01S 19/34
                                                       342/357.63

(Continued)

FOREIGN PATENT DOCUMENTS

EP    3265847 A1    1/2018
JP    H04-121619 A    4/1992

(Continued)

OTHER PUBLICATIONS

Notice of Reasons for Refusal dated May 26, 2020 received in Japanese Patent Application No. JP 2018-040317 together with an English language translation.

(Continued)

*Primary Examiner* — Harry K Liu
(74) *Attorney, Agent, or Firm* — Scully Scott Murphy & Presser

(57) ABSTRACT

A satellite radio wave receiving device including: one or more controllers configured to: continually perform calculation of a current location based on radio waves from positioning satellites received by a receiver; determine whether an action state of the satellite radio wave receiving device detected by an action detection sensor has changed to a stop state; in response to determining that the action state of the satellite radio wave receiving device has changed to the stop state, interrupt the calculation of the current location by causing the receiver to interrupt reception of the radio waves; and cause an output device to perform an interruption notification operation for notifying that the calculation of the current location is being interrupted.

10 Claims, 6 Drawing Sheets

(58) Field of Classification Search
USPC .................................................. 342/357.52
See application file for complete search history.

(56) References Cited

U.S. PATENT DOCUMENTS

| | | |
|---|---|---|
| 2015/0230048 A1 | 8/2015 | Parameshwaran |
| 2015/0237580 A1* | 8/2015 | Yu ..................... H04W 52/0229 |
| | | 370/311 |
| 2016/0245924 A1 | 8/2016 | Tanabe et al. |
| 2016/0259061 A1 | 9/2016 | Carter |
| 2018/0024247 A1 | 1/2018 | Carter |
| 2019/0277972 A1 | 9/2019 | Carter |

FOREIGN PATENT DOCUMENTS

| | | |
|---|---|---|
| JP | H08-029185 A | 2/1996 |
| JP | 2003-337166 A | 11/2003 |
| JP | 2006-171311 A | 6/2006 |
| JP | 2010-197188 A | 9/2010 |
| JP | 2012-194182 A | 10/2012 |
| JP | 2015-87201 A | 5/2015 |
| JP | 2017-096776 A | 6/2017 |
| WO | 2016/144709 A1 | 9/2016 |

OTHER PUBLICATIONS

Examination Report dated Dec. 15, 2020 received in Indian Patent Application No. IN 201914008720.

* cited by examiner

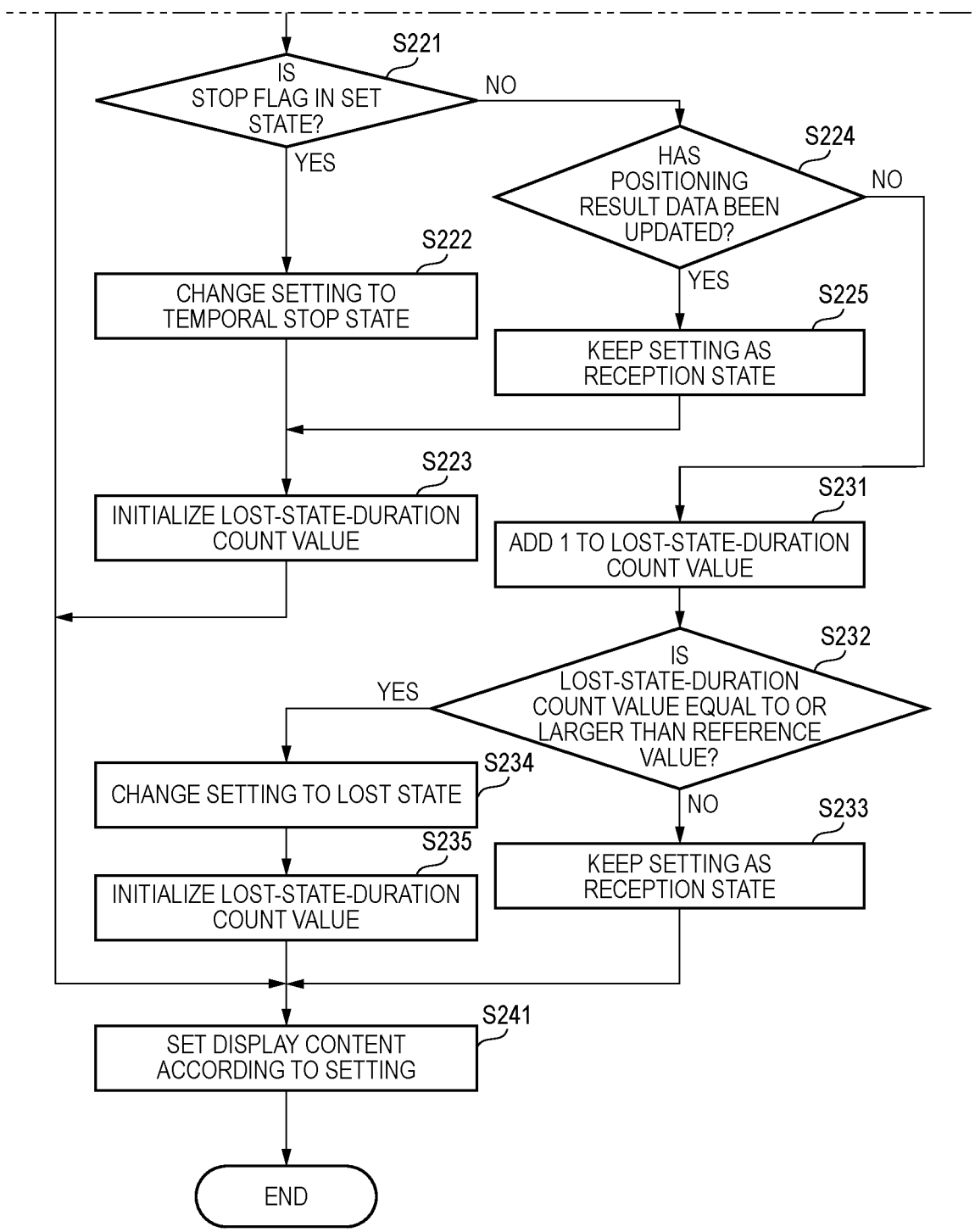
(FIG. 5 Continued)

SATELLITE RADIO WAVE RECEIVING DEVICE, ELECTRONIC TIMEPIECE, METHOD, AND NON-TRANSITORY COMPUTER-READABLE STORAGE MEDIUM

CROSS-REFERENCE TO RELATED APPLICATIONS

This application is based on and claims priority under 35 USC 119 from Japanese Patent Application No. 2018-040317 filed on Mar. 7, 2018, the contents of which are incorporated herein by reference.

BACKGROUND

1. Technical Field

The technical field relates to a satellite radio wave receiving device, an electronic timepiece, a method, and a non-transitory computer-readable storage medium.

2. Description of the Related Art

There is a satellite radio wave receiving device capable of receiving radio waves from a plurality of positioning satellites and acquiring the current location based on satellite signals (navigation messages) included in the received radio waves. While normally receiving radio waves from positioning satellites, the satellite radio wave receiving device can display the movement history of the device and can also perform navigation display based on a predetermined movement route.

Reception of radio waves from positioning satellites and the positioning calculation processing based on received radio waves is a large load and consumes the battery power. As for this, for example, Japanese Patent Application Laid-Open Publication No. 2012-194182 which is a Japanese patent literature discloses a technology for determining whether a device is moving by detecting a vibrating state of the device, and interrupting reception of radio waves from positioning satellites and positioning calculation when the device is not moving or is not being used.

However, in both of the case where reception of radio waves from positioning satellites is interrupted and the case where it is difficult to receive radio waves from satellites due to a blocking object or the like, it is impossible to acquire the current location.

Therefore, the user cannot discriminate between both cases.

SUMMARY

A satellite radio wave receiving device, an electronic timepiece, a method, and a non-transitory computer-readable storage medium are disclosed herein.

One embodiment of the present invention provides a satellite radio wave receiving device comprising: one or more controllers configured to: continually perform calculation of a current location based on radio waves from positioning satellites received by a receiver; determine whether an action state of the satellite radio wave receiving device detected by an action detection sensor has changed to a stop state; in response to determining that the action state of the satellite radio wave receiving device has changed to the stop state, interrupt the calculation of the current location by causing the receiver to interrupt reception of the radio waves; and cause an output device to perform an interruption notification operation for notifying that the calculation of the current location is being interrupted.

Another embodiment of the present invention provides an electronic timepiece comprising: the satellite radio wave receiving device; the receiver; the action detection sensor; the output device; and a clock circuit configured to count current date and time.

Another embodiment of the present invention provides a method for controlling a satellite radio wave receiving device comprising a receiver, an action detection sensor and an output device, the method comprising: continually performing calculation of a current location based on radio waves from positioning satellites received by the receiver; determining whether an action state of the satellite radio wave receiving device detected by the action detection sensor has changed to a stop state; in response to determining that the action state of the satellite radio wave receiving device has changed to the stop state, interrupting the calculation of the current location by causing the receiver to interrupt reception of the radio waves; and causing an output device to perform an interruption notification operation for notifying that the calculation of the current location is being interrupted.

Another embodiment of the present invention provides a non-transitory computer-readable storage medium storing instructions for controlling a satellite radio wave receiving device comprising a receiver, an action detection sensor and an output device, the instructions causing one or more computers to at least: continually perform calculation of a current location based on radio waves from positioning satellites received by the receiver; determine whether an action state of the satellite radio wave receiving device detected by the action detection sensor has changed to a stop state; in response to determining that the action state of the satellite radio wave receiving device has changed to the stop state, interrupt the calculation of the current location by causing the receiver to interrupt reception of the radio waves; and cause the output device to perform an interruption notification operation for notifying that the calculation of the current location is being interrupted.

DETAILED DESCRIPTION

Hereinafter, embodiments will be described with reference to the drawings.

Figure 1:
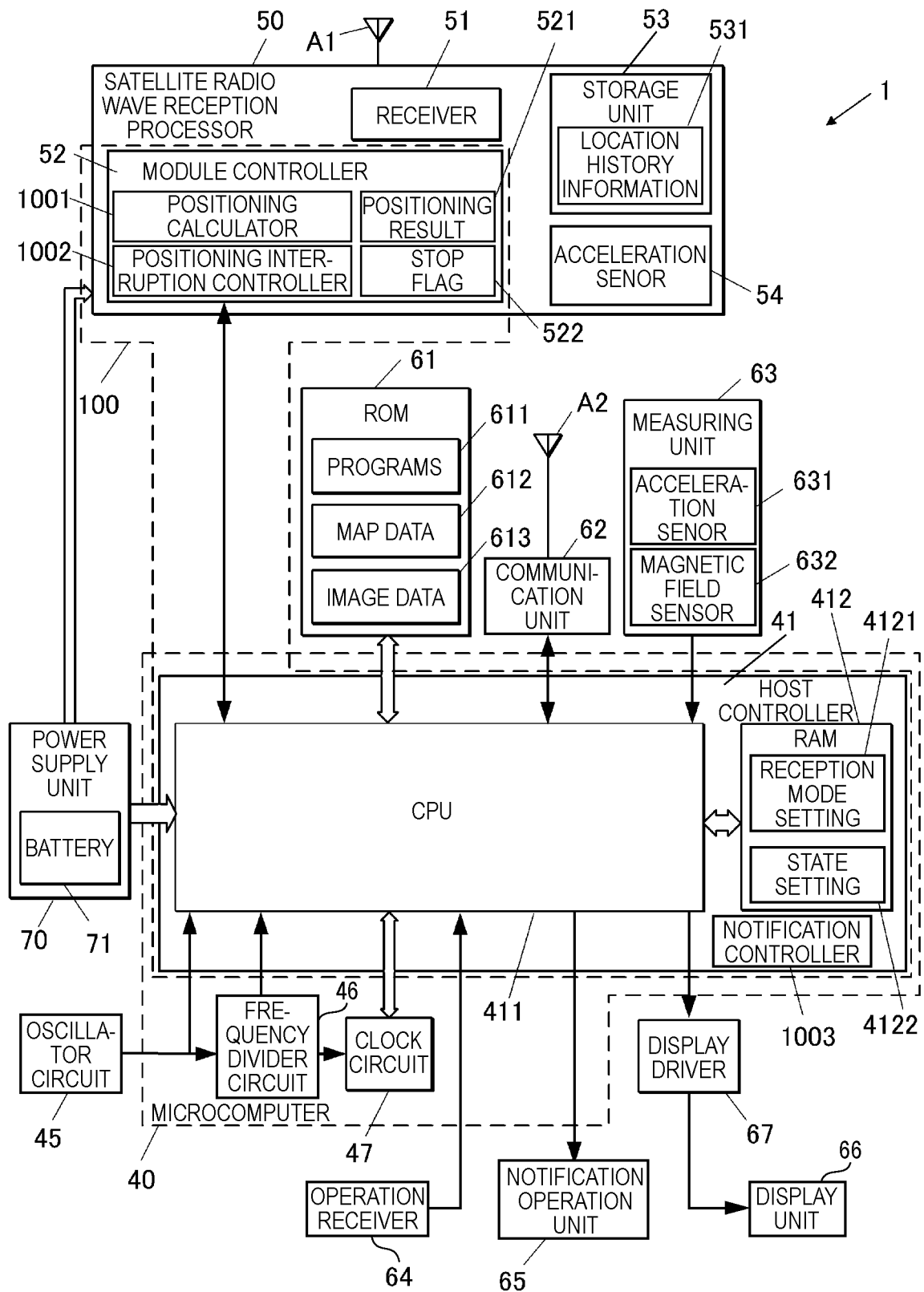
FIG. 1 is a block diagram illustrating the functional configuration of an electronic timepiece of an embodiment.

FIG. 1 is a block diagram illustrating the functional configuration of an electronic timepiece 1 of an embodiment.

The electronic timepiece 1 is an electronic timepiece which a user can usually carry to use, and is, for example, an electronic watch.

The electronic timepiece 1 includes a host controller 41, an oscillator circuit 45, a frequency divider circuit 46, a clock circuit 47, a satellite radio wave reception processor 50, an antenna A1 for the satellite radio wave reception processor, a ROM (Read Only Memory) 61, a communication unit 62, an antenna A2 for the communication unit, a measuring unit 63, an operation receiver 64, a notification operation unit 65, a display unit 66, a display driver 67 for the display unit, a power supply unit 70, and so on.

The host controller 41 is a processor which includes a CPU (Central Processing Unit) 411, a RAM (Random Access Memory) 412, and so on and generally controls the operation of the whole of the electronic timepiece 1.

The CPU 411 performs various calculation processing, and performs control on the operations of the individual units. Also, the CPU 411 can transmit a signal to the clock circuit 47 on the basis of date and time information acquired from the satellite radio wave reception processor 50, thereby correcting the current date and time which the clock circuit 47 counts. Also, the CPU 411 performs movement information display control on the display unit 66 on the basis of the positioning result of the satellite radio wave reception processor 50.

The RAM 412 provides a memory space for work to the CPU 411, and is for storing a variety of temporary data, and setting data which can be updated by overwriting. In data which is stored in the RAM 412, a reception mode setting 4121 and a state setting 4122 are included.

The reception mode setting 4121 is a setting defining whether continual positioning should be performed or intermittent positioning should be performed when a positioning function is performed. The state setting 4122 is a setting for discriminating a state where the positioning result is normally being obtained, a state where reception is in an interruption state due to an action state of the user, and a state where positioning is not being normally performed due to poor reception of satellite radio waves, from one another.

The oscillator circuit 45 outputs an oscillation signal at a predetermined frequency, for example, about 32 kHz. The oscillator circuit 45 is not particularly limited, and is, for example, a circuit including a crystal oscillator.

The frequency divider circuit 46 divides the frequency of the oscillation signal, thereby generating a necessary frequency signal, and outputs the frequency signal. The frequency divider circuit 46 is configured to be able to be appropriately switched between frequency division ratios for outputting signals having different frequencies, according to a control signal from the CPU 411.

The clock circuit 47 counts the current date and time by adding the elapsed time to the setting date and time acquired from a RTC (Real Time Clock) (not shown in the drawings), on the basis of the signal at the predetermined frequency received from the frequency divider circuit 46. The date and time which the clock circuit 47 counts can be corrected by rewriting, according to a control signal from the CPU 411, on the basis of the current date and time data and so on acquired from the satellite radio wave reception processor 50 and so on.

The oscillator circuit 45, the frequency divider circuit 46, and the clock circuit 47 can be formed on the chip of a single microcomputer 40, together with the host controller 41. Alternatively, the crystal oscillator of the oscillator circuit 45, the RAM 412, and so on may be provided outside the microcomputer 40.

The satellite radio wave reception processor 50 is a module for acquiring date and time information and current-location information by receiving transmission radio waves from positioning satellites, and outputting the acquired information. According to a control signal from the CPU 411 The satellite radio wave reception processor 50 is supplied with electric power for operation, separately from the other parts.

The satellite radio wave reception processor 50 includes a receiver 51, a module controller 52, a storage unit 53, an acceleration senor 54 (an action detection sensor), and so on. The receiver 51 captures radio waves (synchronization of reception frequencies, C/A codes, and phases) from individual positioning satellites by receiving transmission radio waves from positioning satellites, using the antenna Al capable of receiving transmission radio waves at the L1 band (which is 1.57542 GHz in the case of positioning satellites, and is about 1.6 GHz in the case of GLONASS satellites), and demodulates signals (navigation messages). The module controller 52 controls the operation of the satellite radio wave reception processor 50. Also, the module controller 52 performs processing of acquiring the current date and time, and calculation processing related to positioning, on the basis of navigation messages acquired from transmission radio waves of positioning satellites. Further, the module controller 52 acquires and analyzes the action state detected by the acceleration senor 54, thereby determining a state of the electronic timepiece (the user), as a walking state or a running state (referred to collectively as a moving state), a stationary state, or the like.

The module controller 52 includes a CPU and a RAM. During the positioning operation, the latest positioning result 521 and the latest stop flag 522 are stored in the RAM of the module controller 52. The positioning result 521 and the stop flag 522 are output to the CPU 411 at intervals of a predetermined time, for example, every second.

The storage unit 53 includes a non-volatile memory and so on, and is for storing control information related to reception of transmission radio waves from positioning satellites, the positioning result, and so on. In the control information, the location information on individual positioning satellites (the ephemeris and the almanac), and so on are included. Also, in the storage unit 53, location history information 531 is stored. The location history information 531 includes current-location information acquired sequentially since start of continual positioning or intermittent positioning. However, a part or all of the storage unit 53 and the RAM of the module controller 52 may be provided outside the module of the satellite radio wave reception processor 50.

The acceleration senor 54 detects the action state of the electronic timepiece by measuring the acceleration of the satellite radio wave reception processor 50, i.e. the electronic timepiece 1 (equipped with the acceleration senor) on three axes. The directions of the three axes of the acceleration senor 54 in the electronic timepiece 1 are set in advance and are held, and the module controller 52 can convert the directions of the three axes into directions relative to the direction of the display screen or the like.

In the ROM 61, various programs 611 for performing various operations, setting data, and application data are stored in advance. The programs 611 includes a positioning-result display control program. The application data includes map data 612 and image data 613 which can be used to display the result of positioning.

The map data 612 is used to display the acquired current location, and the movement history information on movement to the acquired current location, on a display screen 66a of the display unit 66. The image data 613 is image data that is created and stored in advance based on the latest contents which can be displayed, in order to display movement history information.

The communication unit 62 performs operation control on communication with external devices. Herein, as the communication method, for example, near field communication called Bluetooth (which is a trademark) can be used. The host controller 41 performs transmission and reception of information with external devices via the communication unit 62 and the antenna A2 for the communication unit, when the external devices have been set as access object devices in advance and the corresponding settings have been stored in the RAM 412 or the like.

The measuring unit 63 measures various physical amounts and outputs the measurement results. The measuring unit 63 includes, for example, an acceleration senor 631, a magnetic field sensor 632, and so on. Electrical signals related to measurement data are converted into digital samples by an ADC (an analog to digital converter) (not shown in the drawings), and the digital samples are input to the CPU 411.

The operation receiver 64 has a plurality of operation keys and push buttons, and if the operation keys and the push buttons are operated, the operation receiver converts the corresponding operation into an electrical signal, and outputs the electrical signal as an input signal to the CPU 411. Also, the operation receiver 64 may have a crown, a touch sensor, and so on, in addition to or instead of the operation keys and the push buttons.

The notification operation unit 65 performs notification operations on the basis of control signals from the CPU 411. The notification operations include, for example, production of a beep sound, generation of vibration, and so on. Also, the notification operations may include an operation of flashing an LED lamp to illuminate the display screen, and so on. The electronic timepiece 1 includes a beep sound producing circuit, a motor with a weight, a drive circuit for the motor, an LED flickering circuit, and so on, depending on which of the notification operations needs to be performable in the electronic timepiece 1.

The display unit 66 has the display screen, and performs a display operation of displaying a variety of information including date and time information, on the basis of drive signals from the display driver 67. The display screen is not particularly limited, and a dot-matrix liquid crystal display (LCD), an organic EL display, and so on can be used. The display driver 67 is a driver depending on the display method of the display screen. Display operation which is performed by the display unit 66 is included in the notification operations. The notification operation unit 65 and the display unit 66 constitute a notification unit in the electronic timepiece 1 (the satellite radio wave receiving device) of the present embodiment.

The power supply unit 70 supplies electric power necessary for the operations of the individual units of the electronic timepiece 1 at predetermined voltages, from a battery 71. As the battery 71, for example, a button-shaped primary battery installed so as to be removable is used. Alternatively, the power supply unit 70 may have a solar panel, and a storage battery (a rechargeable battery) for storing electric power which is produced by the solar panel, as the battery 71.

The host controller 41 and the module controller 52 constitute a controller 100 of the embodiment of the satellite radio wave receiving device. The controller 100 functions as a positioning calculator 1001, a positioning interruption controller 1002, and a notification controller 1003, as will be described below. Here, the module controller 52 functions as the positioning calculator 1001 and the positioning interruption controller 1002, and the host controller 41 functions as the notification controller 1003; however, the present invention is not limited thereto.

Now, the positioning operation of the present embodiment and the display operation thereof will be described.

In the electronic timepiece 1, as described above, it is possible to selectively perform the continual positioning operation and the intermittent positioning operation (also referred to collectively as the continual positioning operation). Switching between the continual positioning operation and the intermittent positioning operation may be performed on the basis of a predetermined input operation received by the operation receiver 64, a predetermined input setting received by the communication unit 62, or the like.

In the continual positioning operation, the receiver 51 is continually operated such that current-location information is acquired every second. Meanwhile, in the intermittent positioning operation, the receiver 51 is intermittently operated, such that current-location information is acquired at intervals of a predetermined time, for example, 30 seconds, longer than 1 second which is the positioning interval of the continual positioning operation. However, in the intermittent positioning operation, the current location does not necessarily need to be acquired accurately at intervals of 30 seconds, and the receiver 51 may be restarted at intervals of 30 seconds and operate until one current-location information item with a certain degree of accuracy is acquired. Like this, in the electronic timepiece 1 (the satellite radio wave receiving device), a plurality of types of positioning intervals (current-location acquisition intervals) is set, and can be selected if needed.

Also, in the electronic timepiece 1 of the present embodiment, if a situation in which it is determined on the basis of the action state of the satellite radio wave reception processor 50 (the electronic timepiece 1) which is measured by the acceleration senor 54 that the satellite radio wave reception processor 50 (the electronic timepiece 1) is stationary (is not moving) continues for a predetermined reference time or more, it is determined that the satellite radio wave reception processor changes to a temporal stop state (a stop state), and for a predetermined standby time, radio wave reception of the receiver 51 is interrupted, and positioning calculation (continual current-location calculation) of the module controller 52 is interrupted.

Meanwhile, in the electronic timepiece 1, while the continual positioning operation is performed, it is possible to display the movement track and information related to the movement track on the display unit 66.

Figure 2A:
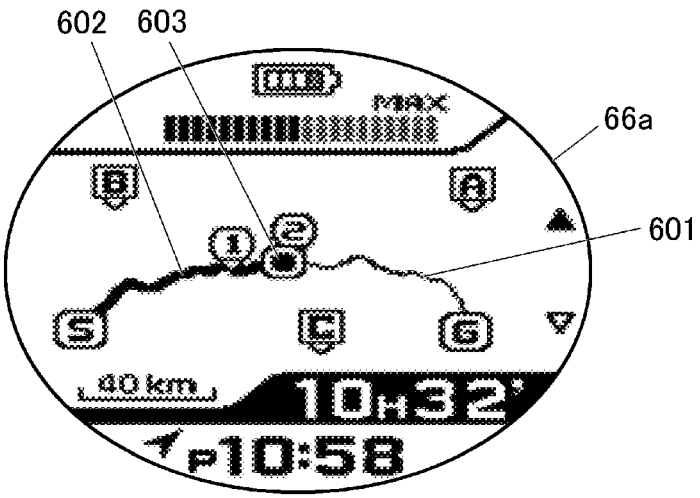
FIG. 2A is a view illustrating a display example which can be shown on the display screen of a display unit.
Figure 2B:
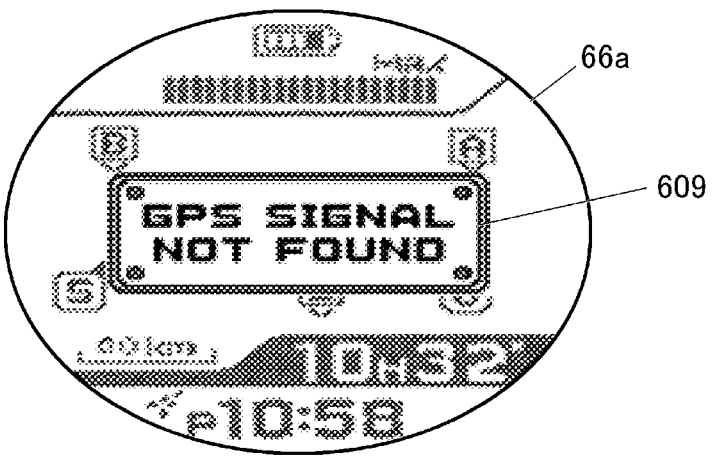
FIG. 2B is a view illustrating another display example which can be shown on the display screen of the display unit.
Figure 2C:
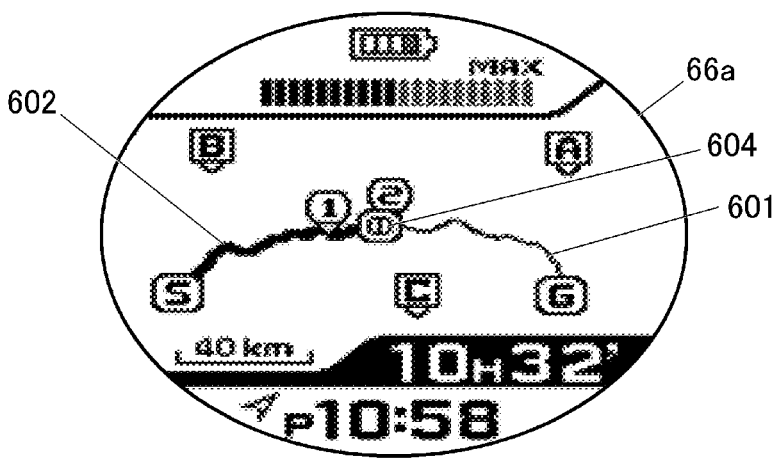
FIG. 2C is a view illustrating a further display example which can be shown on the display screen of the display unit.

FIGS. 2A to 2C are views illustrating display examples which can be shown on the display screen 66a of the display unit 66.

While the positioning result is normally acquired, for example, as shown in FIG. 2A, it is possible to display a predetermined route 601 from a preset start point (S) to a preset goal point (G) and an actually acquired current-location movement history 602, on a map including points A, B, C, and so on around the predetermined route. The current location is shown by a location mark 603. Herein, as the location mark 603, a circular mark is shown. Besides above-mentioned information, the current time (date and time), the elapsed time from the start, the azimuth of the map, the location history (log) acquisition amount, and so on can be displayed on the display screen 66a.

In the course of the continual positioning operation, in tunnels, buildings, and so on, it is difficult to receive radio waves from positioning satellites and normal positioning-result acquisition is not performed. In this situation, as shown in FIG. 2B, on the display screen 66a, a lost-state mask 609 representing that signal reception has failed is displayed. Herein, as the lost-state mask 609, for example, a character string "GPS SIGNAL NOT FOUND" is shown. Also, this display hides a part of the normal display of the movement history 602, the location mark 603, and so on, and the display contrast with during the normal display decreases.

Also, if the satellite radio wave reception processor 50 interrupts radio wave reception and positioning calculation in a state where the user has stopped moving, as shown in FIG. 2C, on the display screen 66a, a stop mark 604 representing the state where the user is stationary at the latest current location (the leading point of the movement history 602) is displayed. The stop mark 604 different from the location mark 603 is not particularly limited, and herein, as the stop mark, two vertical lines parallel with each other are shown. In other words, in the electronic timepiece 1, the content which is displayed if radio wave reception is attempted but fails is different from the content which is displayed if radio wave reception of the receiver 51 is interrupted when the user stops moving.

Figure 3:
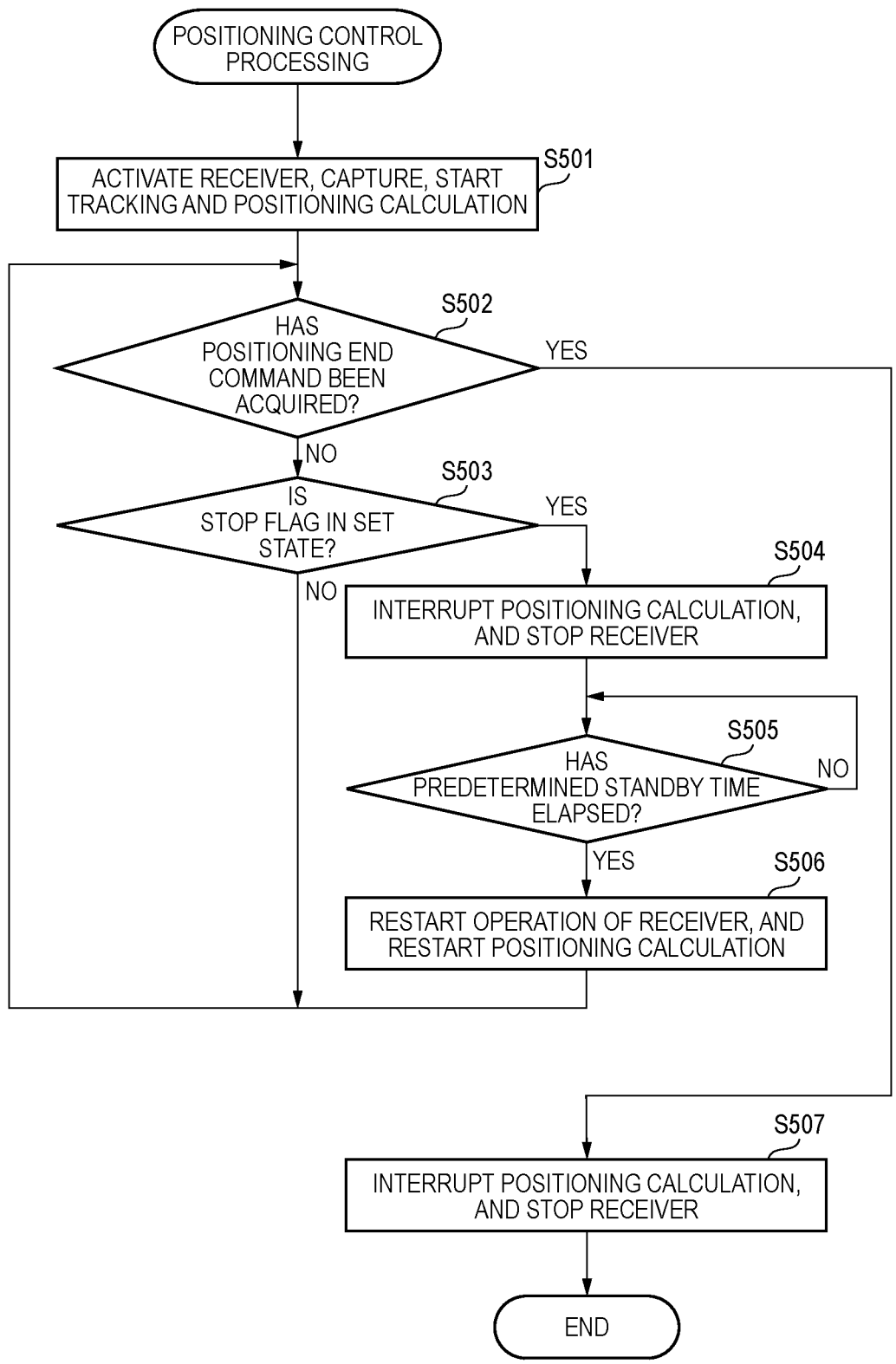
FIG. 3 is a flow chart illustrating the control procedure of positioning control processing.

FIG. 3 is a flow chart illustrating the procedure of control of the module controller 52 in the positioning control processing which is performed by the satellite radio wave reception processor 50.

This positioning control processing is started if the above-described continual positioning operation is started. If the positioning control processing is started, the module controller 52 (a CPU) activates the receiver 51, thereby capturing radio waves from positioning satellites, and starts tracking of the captured radio waves and positioning calculation (STEP S501). If reception and positioning calculation are started, the module controller 52 identifies the current date and time and the current location at positioning intervals selected for continual positioning or intermittent positioning, and writes them in the RAM (the positioning calculator 1001) (a positioning calculation step). If it fails to receive radio waves from as many positioning satellites as necessary, or positioning calculation does not correctly end (the positioning calculation results do not converge), the module controller 52 does not perform writing of the current date and time and the current location in the RAM. In other words, the current date and time and the current location written in the RAM are values obtained at the latest timing when positioning (radio wave reception and positioning calculation) succeeded.

The module controller 52 determines whether a positioning end command has been acquired from the host controller 41 (STEP S502). In the case where it is determined that a positioning end command has been acquired ("YES" in STEP S502), the module controller 52 interrupts positioning calculation, and interrupts the reception operation of the receiver 51 (STEP S507). Then, the module controller 52 ends the positioning control processing.

In the case where it is determined that a positioning end command has not been acquired ("NO" in STEP S502), the module controller 52 determines whether the stop flag 522 written in the RAM by a movement determination processing to be described below is "1" representing the set state (STEP S503). In the case where it is determined that the stop flag 522 is not in the set state, in other words, the stop flag is "0" representing the reset state ("NO" in STEP S503), the processing of the module controller 52 returns to STEP S502.

In the case where it is determined that the stop flag 522 is "1" representing the set state (i.e. the electronic timepiece has changed to the stop state) ("YES" in STEP S503), the module controller 52 interrupts positioning calculation (current-location calculation), and interrupts the reception operation of the receiver 51 (the positioning interruption controller 1002) (STEP S504) (a positioning interruption control step). The module controller 52 counts the elapsed time from the processing of STEP S504.

The module controller 52 determines whether the counted elapsed time has exceeded a predetermined interruption time (STEP S505). In the case where it is determined that the interruption time has not elapsed ("NO" in STEP S505), the processing of the module controller 52 returns to STEP S505. In the case where it is determined that the interruption time has elapsed ("YES" in STEP S505), the module controller 52 restarts the reception operation of the receiver 51, and restarts the positioning calculation processing (STEP S506). Then, the processing of the module controller 52 returns to STEP S502.

Figure 4:
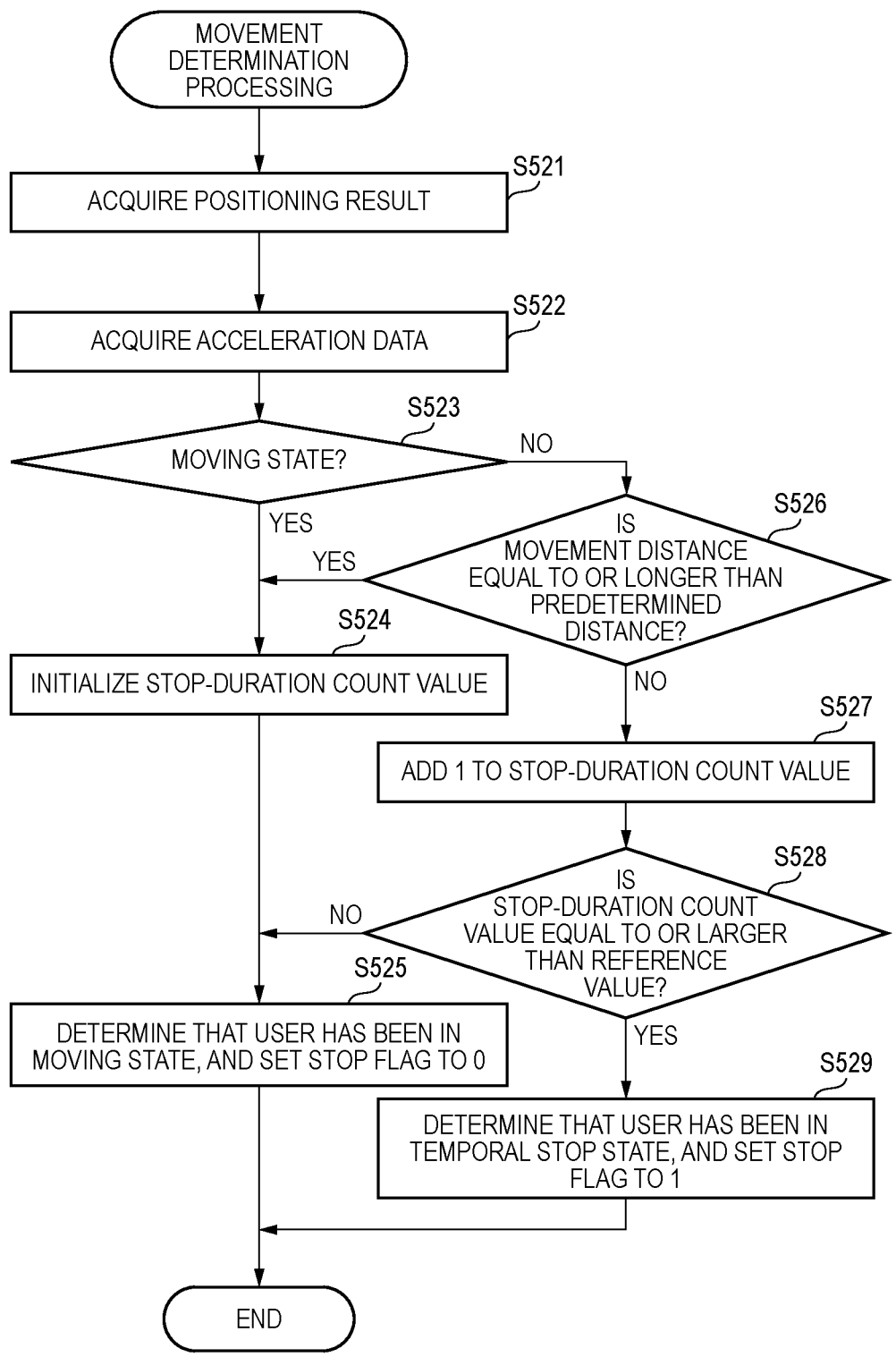
FIG. 4 is a flow chart illustrating the control procedure of movement determination processing.

FIG. 4 is a flow chart illustrating the procedure of control of the module controller 52 in the movement determination processing which is performed by the satellite radio wave reception processor 50.

This movement determination processing is activated and performed at intervals of a predetermined time. As this interval, a time longer than the current-location acquisition interval of the continual positioning operation is set. For example, during the continual positioning operation, the movement determination processing may be activated once every 30 seconds, and during the intermittent positioning operation, the movement determination processing may be activated once every 60 seconds.

If the movement determination processing is started, the module controller 52 acquires the latest positioning result from the RAM (STEP S521). The module controller 52 acquires acceleration data of the period from the previous movement determination processing to the current movement determination processing acquired by the acceleration senor 631 (STEP S522).

The module controller 52 determines whether the user has been in the moving state in the period of the acceleration data (the action state has satisfied a first reference), by analyzing the acquired acceleration data (STEP S523). Herein, if it is determined that the action state detected by the acceleration senor 54 was in a walking state, a running state, or the like in at least a part of the corresponding period, it is considered that the user has been in the moving state (the first reference has been satisfied); however, the present invention is not limited thereto. In the case where it is determined that the user has been in the moving state ("YES" in STEP S523), the module controller 52 sets the stop-duration count value to an initial value "0" (STEP S524). Also, the module controller 52 determines that the user has been in the moving state, and sets the stop flag 522 to the reset state, i.e. "0", and writes the set value in the RAM (STEP S525). Then, the module controller 52 ends the movement determination processing.

In the case where it is determined in the determining processing of STEP S523 that the user has not been in the moving state ("NO" in STEP S523), the module controller 52 determines whether the distance (the movement amount) between the current location related to the latest positioning result and the current location related to the positioning result acquired by the previous movement determination processing is equal to or longer than a predetermined distance (a second reference is satisfied) (STEP S526). In the case where it is determined that the corresponding movement distance is equal to or longer than the predetermined distance ("YES" in STEP S526), the processing of the module controller 52 proceeds to STEP S524.

In the case where it is determined that the movement distance is not equal to or longer than the predetermined distance ("NO" in STEP S526), the module controller 52 determines that the user has been in the stationary state, and adds "1" to the stop-duration count value (STEP S527). The module controller 52 determines whether the stop-duration count value is equal to or larger than a predetermined reference value (STEP S528). The reference value may depend on each of the continual positioning operation and the intermittent positioning operation (the reference value may depend on each of a plurality of intervals set for current date and time acquisition). Also, a duration (a first reference time) corresponding to the reference value for the continual positioning operation may be different from that for the intermittent positioning operation. In other words, during the continual positioning operation, the reference value for the movement determination processing which is performed once every 30 seconds may be set to "6" (3 minutes), and during the intermittent positioning operation, the reference value for the movement determination processing which is performed once every 60 seconds may be set to "4" (4 minutes).

In the case where it is determined that the stop-duration count value is not equal to or larger than the reference value (the stop-duration count value is smaller than the reference value) ("NO" in STEP S528), the processing of the module controller 52 proceeds to STEP S525. In the case where it is determined that the stop-duration count value is equal to or larger than the reference value ("YES" in STEP S528), the module controller 52 determines that the user has been in a temporal stop state, and sets the stop flag 522 to the set state, i.e. "1", and writes the set value in the RAM (STEP S529). Then, the module controller 52 ends the movement determination processing.

Figure 5:
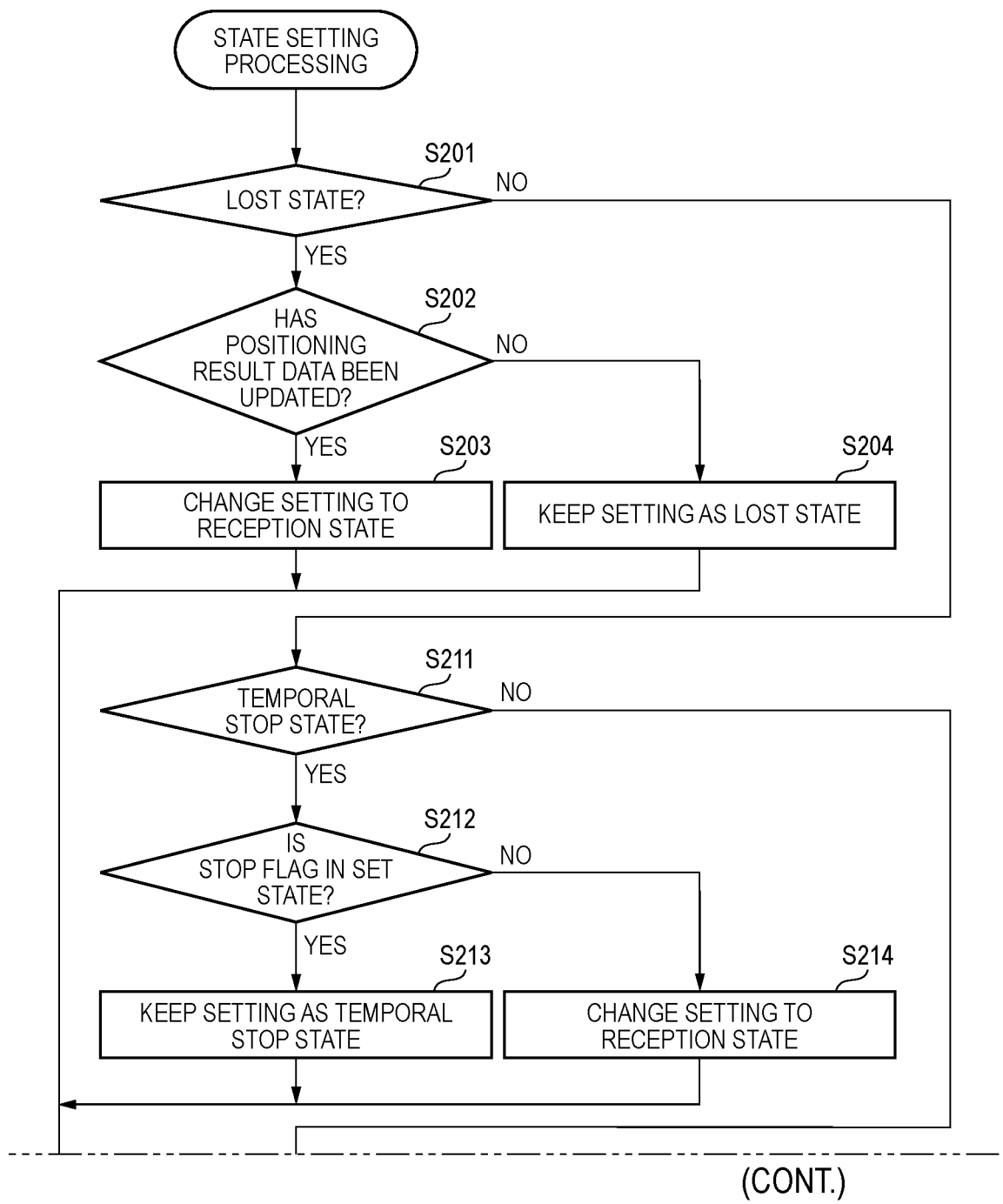
FIG. 5 is a flow chart illustrating the control procedure of state setting processing.

FIG. 5 is a flow chart illustrating the procedure of control of the host controller 41 in a state setting processing which is performed by the electronic timepiece 1.

This state setting processing is performed at the same frequency as that of the movement determination processing. The start timing of the state setting processing and the end timing of the movement determination processing do not need to be precisely associated, and for example, during the continual positioning operation, the movement determination processing may be activated at 15 seconds past every minute and at 45 seconds past every minute, and the state setting processing may be activated at 16 seconds past every minute and at 46 seconds past every minute.

If the state setting processing is started, the host controller 41 (the CPU 411) determines whether the current set state is a lost state (STEP S201). The lost state means a state where radio wave reception of the receiver 51 is not in the interruption state, but the receiver 51 cannot receive radio waves necessary to calculate the current location (it is impossible to calculate the current location). In the case where it is determined that the current set state is the lost state ("YES" in STEP S201), the host controller 41 determines whether the current date and time related to the latest positioning result acquired from the satellite radio wave reception processor 50 is different from the current date and time acquired by the previous state setting processing, i.e. whether the positioning result data stored in the RAM of the module controller 52 has been updated (STEP S202). In the case where it is determined that the positioning result data has been updated ("YES" in STEP S202), the host controller 41 changes the setting to the reception state (STEP S203). Then, the processing of the host controller 41 proceeds to STEP S241. In the case where it is determined that the positioning result data has not been updated ("NO" in STEP S202), the host controller 41 keeps the setting as the lost state (STEP S204). In other words, in the case where the processing related to interruption of the reception of the receiver 51 and interruption of positioning calculation are performed by the processing of STEP S524 in the lost state, without considering the setting of the stop flag 522 related to the setting of the temporal stop state, it is not determined that the current set state is the temporal stop state (in STEP S241 to be described below, an interruption notification operation is not performed). Then, the processing of the host controller 41 proceeds to STEP S241.

In the case where it is determined in the determining processing of STEP S201 that the current set state is not the lost state ("NO" in STEP S201), the host controller 41 determines whether the current set state is the temporal stop state (STEP S211). In the case where it is determined that the current set state is the temporal stop state ("YES" in STEP S211), the host controller 41 determines whether the acquired latest stop flag 522 is "1" representing the set state (STEP S212). In the case where it is determined that the latest stop flag is "1" representing the set state ("YES" in STEP S212), the host controller 41 keeps the setting as the temporal stop state (STEP S213). Then, the processing of the host controller 41 proceeds to STEP S241. In the case where it is determined that the latest stop flag is not "1" representing the set state (the latest stop flag is "0" representing the reset state) ("NO" in STEP S212), the host controller 41 changes the setting to the reception state (STEP S214). Then, the processing of the host controller 41 proceeds to STEP S241.

In the case where it is determined in the determining processing of STEP S211 that the current set state is not the temporal stop state ("NO" in STEP S211), the host controller 41 determines whether the acquired latest stop flag 522 is "1" representing the set state (STEP S221). In the case where it is determined that the latest stop flag is "1" representing the set state ("YES" in STEP S221), the host controller 41 changes the setting to the temporal stop state (STEP S222). The host controller 41 sets the lost-state-duration count value to an initial value "0" (STEP S223). Then, the processing of the host controller 41 proceeds to STEP S241.

In the case where it is determined in the determining processing of STEP S221 that the stop flag is not "1" representing the set state (the stop flag is "0" representing the reset state) ("NO" in STEP S221), the host controller 41 determines whether the current date and time related to the latest positioning result acquired from the satellite radio wave reception processor 50 is different from the current date and time acquired by the previous state setting processing, i.e. whether the positioning result data stored in the RAM of the module controller 52 has been updated (STEP S224). In the case where it is determined that the positioning result data has been updated ("YES" in STEP S224), the host controller 41 keeps the setting as the reception state (STEP S225). Then, the processing of the host controller 41 proceeds to STEP S223.

In the case where it is determined in the determining processing of STEP S224 that the positioning result data has not been updated ("NO" in STEP S224), the host controller 41 adds "1" to the lost-state-duration count value (STEP S231). The module controller 52 determines whether the lost-state-duration count value is equal to or larger than a predetermined reference value (STEP S232). This reference value may be set to be smaller than the above-mentioned reference value for the stop-duration count value (i.e. such that the time corresponding to the reference value is short). Also, the reference value may depend on each of the continual positioning operation and the intermittent positioning operation, and the time (a second reference time) corresponding to the reference value may depend on each positioning operation. For example, it is possible to set the reference value for the continual positioning operation to "3" (corresponding to 1 minute 30 seconds), and set the reference value for the intermittent positioning operation to "2" (corresponding to 2 minutes).

In the case where it is determined that the lost-state-duration count value is equal to or larger than the reference value, i.e. reception of necessary radio waves has failed continually for the second reference time or more ("YES" in STEP S232), the host controller 41 changes the setting to the lost state (STEP S234). Also, the host controller 41 sets the lost-state-duration count value to an initial value "0" (STEP S235). Then, the processing of the host controller 41 proceeds to STEP S241.

In the case where it is determined that the lost-state-duration count value is not equal to or larger than the reference value ("NO" in STEP S232), the host controller 41 keeps the setting as the reception state (STEP S233). Then, the processing of the host controller 41 proceeds to STEP S241.

If the processing of the host controller proceeds from the processing of STEP S203, S204, S213, S214, S223, S233, or S235 to the processing of STEP S241, the host controller 41 performs display content setting (STEP S241). The host controller 41 sets display image data obtained by superimposing the lost-state mask 609 (in the case of a lost-state notification operation), the location mark 603 (in the case of the reception state), or the stop mark 604 (in the case of display related to the interruption notification operation) on the current-location history display. In other words, the display of the lost-state mask 609 related to the lost-state notification operation and the display of the stop mark 604 related to the interruption notification operation are maintained until the user gets out of the lost state and the stop state, respectively. Then, the host controller 41 ends the state setting processing.

Also, unless the storage data of the set state is not initialized, the processing of keeping the set state (STEP S204, S213, S225, or S233) may be omitted.

By the processing of STEPS S221, S222, and S241, the notification controller 1003 of the satellite radio wave receiving device of the present embodiment and a notification control step of the method is configured.

The above-mentioned state setting processing may be performed by the module controller 52 of the satellite radio wave reception processor 50. In this case, instead of the processing of STEP S241, the information on the set state (the reception state, the temporal stop state, or the lost state) is output to the host controller 41. The host controller 41 performs the processing of STEP S241 on the basis of the acquired set state.

Meanwhile, the movement determination processing may be performed by the host controller 41. In this case, the acceleration data and so on may be acquired from the satellite radio wave reception processor 50, and the action state detected by the measuring unit 63 may be used in the processing. The host controller 41 immediately transmits the set stop flag to the satellite radio wave reception processor 50. The module controller 52 performs control on whether to perform the reception operation of the receiver 51 and the positioning calculation processing of the module controller 52, on the basis of the acquired stop flag.

As described above, the electronic timepiece 1 including the satellite radio wave receiving device of the present embodiment includes the receiver 51 for receiving radio waves from positioning satellites, the acceleration senor 54 for detecting the action state of the electronic timepiece, the display unit 66 and the notification operation unit 65 serving as a notification unit for performing notification operations, and the controller 100. The module controller 52 of the controller 100 serves as the positioning calculator 1001 to continually calculate the current location on the basis of radio waves which are received by the receiver 51, and serves as the positioning interruption controller 1002 to interrupt radio wave reception of the receiver 51 and interrupt current-location calculation if it is determined that the action state of the electronic timepiece has changed to the stop state. Also, the host controller 41 of the controller 100 serves as the notification controller 1003 to control the notification unit (the display unit 66) such that the notification unit performs the interruption notification operation of notifying that current-location calculation is in the interruption state.

As described above, in the electronic timepiece 1 capable of acquiring current-location information with high accuracy while appropriately suppressing power consumption, when the electronic timepiece is in the stop state, the reception operation and positioning calculation are interrupted, and display representing the interruption of the reception operation and positioning calculation is performed, such that the user can surely recognize that the unnecessary positioning operation has been autonomously interrupted. Therefore, by the electronic timepiece 1 (the satellite radio wave receiving device), the user can more easily recognize the positioning state, i.e. the user can accurately determine that there is no problem in the radio wave reception state.

Also, if it is determined that the electronic timepiece has changed to the lost state, i.e. radio wave reception of the receiver 51 has not been interrupted but the receiver 51 cannot receive radio waves necessary to calculate the current location, the controller 100 (the host controller 41) controls the notification unit (the display unit 66) such that the notification unit performs the lost-state notification operation of notifying that current-location calculation is impossible. As described above, in the case where radio wave reception is attempted but reception of radio waves necessary for positioning is impossible, the notification operation separate from the interruption notification operation is performed, such that the user can appropriately recognize that the positioning result is not being normally acquired. In other words, in this case, it is possible to urge the user to move to a situation in which the reception condition is good if positioning is necessary. In contract, in the case where the above-described interruption notification operation is being performed, since it can be said that the electronic timepiece is not in the lost state, it is unnecessary to urge the user to make an unnecessary effort to improve the reception environment.

Also, in the case where it is determined that the action state of the electronic timepiece has changed to the stop state during the lost state, the controller 100 interrupts radio wave reception of the receiver 51 and interrupts current-location calculation, without controlling the notification unit (the display unit 66) such that the notification unit performs the interruption notification operation.

In other words, while keeping notifying that the reception condition is bad, an unnecessary positioning operation is prevented unless the location is changed. Therefore, it is possible to appropriately suppress the power consumption.

Also, in the case where the action state of the electronic timepiece which is detected by the acceleration senor 54 does not change to the moving state for the first reference time or more, and the movement amount of the current location which is calculated is shorter than the predetermined distance for the first reference time or more, the controller 100 determines that the electronic timepiece is in the stop state.

In other words, the temporal stop state is not immediately determined, but is determined if the stationary state continues for a predetermined time. Therefore, since re-activation and restart of capturing of radio waves from positioning satellites are not performed due to every temporal short-time stop, unnecessary processing is not increased. Also, in the case where irregular temporal short-time stops occur frequently, it is possible to prevent irregularity in the positioning timing from being easily caused by time lags from moving timings to restart of reception.

Also, in the case where the receiver 51 fails in receiving radio waves necessary to calculate the current location, continually for the second reference time or more, the controller 100 (the host controller 41) determines that the electronic timepiece has changed to the lost state, and the first reference time is set to be longer than the second reference time.

In other words, since the temporal stop determination is performed slowly than the determination of the lost state is, in the case where the user temporally stops at a place where it is impossible to receive radio waves from positioning satellites, it is possible to first notify the user of that situation in which it is impossible to receive radio waves.

Also, the controller 100 can set a plurality of current-location acquisition intervals (for example, the interval of 1 second and the interval of 30 seconds) for continual (continuous or intermittent) current-location calculation, and change the first reference time related to temporal stop, depending on the set acquisition interval. Interruption of the reception operation and positioning calculation attributable to the temporal stop state does not necessarily need to be performed, in other words, interruption of the reception operation and positioning calculation does not need to be performed in real time for a time too much shorter than the current-location acquisition interval. Also, in the case of intermittent positioning, since the positioning operation is interrupted at intervals, it is unnecessary to quickly perform a change to the temporal stop state. Therefore, if an appropriate first reference time is set depending on the reception mode, the positioning interval, and so on, more than a necessary processing load is not applied.

Also, the notification unit includes the display unit 66 for performing display operations. The controller 100 controls the display unit 66 such that the display unit performs display related to an interruption notification operation, and maintains the display related to the interruption notification operation until the electronic timepiece gets out of the stop state. In other words, while the positioning operation of the satellite radio wave reception processor 50 is in the autonomous interruption state, display of the corresponding information is continued. Therefore, it is possible to notify the user of whether the positioning operation is being performed or not, in real time. Therefore, particularly, after restarting to move, the user can appropriately recognize whether returning to the reception state has been appropriately performed.

Also, the controller 100 controls the display unit 66, such that the display unit displays the acquired current-location information and performs display of the current-location information and display related to the interruption notification operation in parallel in the case of the stop state. In other words, in the case of a temporal stop, since display of the current-location information is not deleted. Therefore, during a temporal stop, the user can easily and surely perform checking of the current location and the movement history, and so on. Also, in the electronic timepiece 1 (the power conversion device) which also performs the lost-state notification operation, since the interruption notification operation is distinguished from the lost-state notification operation, it is possible to determine whether the current-location information is the latest information, or not. Also, as shown in FIG. 2B, during the lost-state notification operation, display of the current location and the movement history is deleted or dehighlighted. Therefore, it is possible to switch the display state of the current location and the movement history according to whether any current location has been acquired recently, and it is possible to prevent the lost-state notification operation from causing the user to misunderstand the current location or hindering checking of the accurate current location.

Also, the electronic timepiece 1 of the present embodiment includes the individual components related to the above-described satellite radio wave receiving device, and the clock circuit 47 for counting the current date and time. In other words, since the electronic timepiece 1 is configured to perform the positioning operation and the notification operations described above, it is possible to efficiently notify the user that the current-location acquisition state (i.e. whether the positioning operation is being normally performed, or the positioning operation is in the autonomous temporal interruption state) while appropriately suppressing the power consumption of the electronic timepiece 1.

Also, the method of the satellite radio wave receiving device (the electronic timepiece 1) of the present embodiment includes the positioning calculation step of continually calculating the current location on the basis of radio waves which are received by the receiver 51 (the positioning calculation operation which is started on the basis of the processing of STEP S501), the positioning interruption control step of interrupting radio wave reception of the receiver 51 and interrupting current-location calculation if it is determined that the action state of the electronic timepiece has changed to the stop state (STEP S504), and the notification control step of controlling the notification unit (the display unit 66) such that the notification unit performs the interruption notification operation of notifying that current-location calculation is in the interruption state, if current-location calculation is interrupted in the positioning interruption control step (STEP S221, S222, or S241).

As described above, the method makes it possible to acquire the current-location information with high accuracy while appropriately suppressing the power consumption, and makes display representing interruption of the reception operation and positioning calculation if the reception operation and positioning calculation are interrupted due to the stop state of the satellite radio wave receiving device. In this way, it is possible to make the user surely recognize that the unnecessary positioning operation is in the autonomous interruption state. Therefore, according to the method, it is possible to reduce the power consumption, and the user can more easily recognize the positioning state.

However, the present invention is not limited to the above-described embodiment, and can be modified in various forms.

For example, in the above-described embodiment, the case where the acceleration senor 54 is used as the action detection sensor has been described; however, in addition to or instead of the acceleration senor, other detecting units for detecting other physical amounts and variations of the corresponding physical amounts, such as a magnetic field sensor, may be included. Also, the measuring unit 63 may be used as the action detection sensor. Also, the host controller 41 may directly acquire the measurement result of the measuring unit 63 to perform determination on the temporal stop state, or may acquire the detection result of the acceleration senor 54 from the satellite radio wave reception processor 50 to perform determination on the temporal stop state. Also, the measuring unit 63 may include sensor other than the acceleration senor 631 and the magnetic field sensor 632, for example, an inclination sensor and a gyroscope sensor, and may not include the magnetic field sensor 632 and so on.

Also, in the present embodiment, in STEP S526 of the movement determination processing, the distance (the movement amount) between the current location related to the latest positioning result and the current location related to the positioning result acquired by the previous movement determination processing is compared with the predetermined distance which is a reference; however, the distance between the final current-location detected in the latest moving state and the current location related to the latest positioning result, i.e. the total movement distance in the period when the stationary state has continued (the sum of vector quantities, wherein in a certain combination of individual movement directions, vector quantities may be cancelled) may be used.

Also, in the above-described embodiment, switching between continual reception at intervals of 1 second and intermittent reception at intervals of 30 seconds is possible; however, each of the positioning intervals according to continual reception and intermittent reception may be changeable. Also, only one of continual reception and intermittent reception may be possible.

Also, as long as the interruption notification operation and the lost-state notification operation can be distinguished from each other, in addition to or instead of display on the display unit 66, other operations by an output device, such as flashing or turning on LEDs in different patterns or different colors, and vibration operations in different vibration patterns may be performed by the notification operation unit 65. Also, the satellite radio wave receiving device may be configured to acquire only a log and perform the notification operation related to the acquisition of the log, without including the display unit 66. In this case, log data may be output to the outside by the communication unit 62 such that the log data can be displayed on an external device. Also, even in the case where the satellite radio wave receiving device can perform the display operation, the movement history may not be completely displayed, and only the latest latitude, longitude, and elevation values may be displayed. In this case and so on, as the location mark 603 and the stop mark 604, marks different from those shown in the above-described embodiment may be used.

Also, in the above-described embodiment, in the temporal stop state and the lost state, the interruption notification operation and the lost-state notification operation are continually performed; however, these operations may be continued for predetermined times, and then be stopped. In this case, restart of those operations based on predetermined input operations may be possible, and if returning to the reception state, a notification operation for notifying the setting of the reception state may be performed for a predetermined time.

Also, in the above-described embodiment, display of the lost-state notification operation is performed; however, in the lost state, the content representing that the latest positioning date and time does not change may be simply displayed.

Also, in the above-described embodiment, in the case where the satellite radio wave receiving device changes to the temporal stop state in the course of the lost-state notification operation, the interruption notification operation is not performed; however, both of the notification operations may be performed at the same time.

Also, in the above-described embodiment, the reference time related to setting of the temporal stop state is set to be longer than the reference time related to setting of the lost state, and the satellite radio wave receiving device in the stationary state can change to the lost state before changing to the temporal stop state; however, the reference times may be the same, or the reference time related to setting of the temporal stop state may be shorter than setting of the reference time related to the lost state.

Also, in the above-described embodiment, the case where the electronic timepiece has the host controller 41 and the module controller 52 separately has been described; however, the electronic timepiece 1 (the satellite radio wave receiving device) may have only one controller. Also, the case where each of the host controller 41 and the module controller 52 which are processors has the CPU, and performs the control operation in software wise has been described; however, dedicated hardware circuits and so on may be provided such that some processing can be performed by the hardware circuits. Also, at least one of the host controller 41 and the module controller 52 may further include a dedicated CPU and a dedicated RAM for performing some software processing.

Also, the ROM 61 and the storage unit 53 may be shared, and for example, one common non-volatile memory may be provided in the module of the satellite radio wave reception processor 50. In this case, the host controller 41 issues a storage content read (write) request to the module controller 52. The module controller 52 temporally stores data read from the storage unit 53 in response to the read request, in the ROM of the module controller, and transmits the corresponding data to the host controller 41 (the CPU 411). Alternatively, the host controller 41 may directly access to at least a part of the RAM of the module controller 52 or the storage unit 53. The access of the host controller 41 to the storage unit 53 or the RAM may be possible without operating the receiver 51 and the CPU of the module controller 52 in the satellite radio wave reception processor 50. Also, the module controller 52 stores data acquired from the host controller 41 according to a write request, in the storage unit 53. Also, in this case, the module controller 52 may perform processing of generating image data 613, and store the image data without any change in the storage unit 53.

In contrast, the satellite radio wave reception processor 50 may not include the storage unit 53, and non-volatile data to be saved also may be stored in the ROM 61 outside the module. In this case, the module controller 52 requests the host controller 41 to read a content stored in the ROM 61 or write a content in the ROM 61. The module controller 52 may be able to directly access to the ROM 61, or may be able to access to the ROM 61 via the host controller 41. Also, the satellite radio wave reception processor 50 may operate without using data of the ROM 61 other than the control program, the setting data, and so on which are input from the host controller 41 during activation. All of saving of the movement history and generation of image data 613 may be performed by the host controller 41.

Also, in the above description, the ROM 61 composed of a non-volatile memory such as a flash memory or a mask ROM has been described as an example of a computer-readable medium for storing the programs 611 related to positioning control and display settings; however, the present invention is not limited thereto. As other computer-readable media, HDD (hard disk drive) and portable recording media such as CD-ROM and DVD can be applied.

Moreover, the details of the components, the control procedures, the display examples, and so on shown in the above-described embodiments can be appropriately modified without departing from the scope of the present invention.

Although some embodiments have been described, the scope of the present invention is not limited to the above described embodiments, and includes the scopes of inventions disclosed in claims and the scopes of their equivalents.

What is claimed is:

1. A satellite radio wave receiving device comprising:
   one or more controllers configured to:
      continually perform calculation of a current location based on radio waves from positioning satellites received by a receiver;
      determine whether an action state of the satellite radio wave receiving device detected by an action detection sensor has changed to a stop state;
      in response to determining that the action state of the satellite radio wave receiving device has changed to the stop state, interrupt the calculation of the current location by causing the receiver to interrupt reception of the radio waves;
      cause an output device to perform an interruption notification operation for notifying that the calculation of the current location is being interrupted;
      determine whether the reception of the radio waves by the receiver is interrupted;
      determine whether the receiver is in a lost state in which the receiver has failed to receive radio waves required to calculate the current location;
      in response to determining that the reception of the radio waves is not interrupted and that the receiver has failed to receive the radio waves required to calculate the current location, cause the output device to perform a lost-state notification operation for notifying that it is impossible to calculate the current location;
      determine whether the action state of the satellite radio wave receiving device detected by the action detection sensor has changed to the stop state during the lost state of the receiver; and
      in response to determining that the action state of the satellite radio wave receiving device has changed to the stop state during the lost state of the receiver, interrupt the calculation of the current location by causing the receiver to interrupt reception of the radio waves without causing the output device to perform the interruption notification operation.

2. The satellite radio wave receiving device according to claim 1,
   wherein the one or more controllers are configured to:
      determine whether the action state of the satellite radio wave receiving device detected by the action detection sensor continually satisfies a first reference for a first reference time or more, and whether a movement amount of the satellite radio wave receiving device calculated based on the current location calculated continually satisfies a second reference for the first reference time or more; and
      in response to determining that the action state of the satellite radio wave receiving device does not continually satisfy the first reference for the first reference time or more, and the movement amount of the satellite radio wave receiving device calculated based on the current location calculated does not continually satisfy the second reference for the first reference time or more, determine that the action state of the satellite radio wave receiving device detected has changed to the stop state.

3. The satellite radio wave receiving device according to claim 1,
   wherein the one or more controllers are configured to:
      determine whether the action state of the satellite radio wave receiving device detected by the action detection sensor continually satisfies a first reference for a first reference time or more, and whether a movement amount of the satellite radio wave receiving device calculated based on the current location calculated continually satisfies a second reference for a second reference time or more;
      in response to determining that the action state of the satellite radio wave receiving device does not continually satisfy the first reference for the first reference time or more, and the movement amount of the satellite radio wave receiving device calculated based on the current location calculated does not continually satisfy the second reference for the second reference time or more, determine that the action state of the satellite radio wave receiving device detected has changed to the stop state;
      determine whether the receiver continually fails to receive the radio waves required to calculate the current location;
      in response to determining that the receiver continually fails to receive the radio waves required to calculate the current location, determine that the receiver is in the lost state; and
      set the first reference time to be longer than the second reference time.

4. The satellite radio wave receiving device according to claim 2,
   wherein the one or more controllers are configured to:
      set one of a plurality of acquisition intervals at which calculation of the current location is continually performed; and
      change the first reference time depending on the one of the plurality of acquisition intervals set.

5. The satellite radio wave receiving device according to claim 3,
   wherein the one or more controllers are configured to:
      set one of a plurality of acquisition intervals at which calculation of the current location is continually performed; and
      change the first reference time depending on the one of the plurality of acquisition intervals set.

6. The satellite radio wave receiving device according to claim 1,
wherein the output device comprises a display, and
wherein the one or more controllers are configured to:
determine whether the action state of the satellite radio wave receiving device detected by the action detection sensor has changed from the stop state to another state; and
cause the display to perform display related to the interruption notification operation, and to cause the display to keep performing the display related to the interruption notification operation until the action state of the satellite radio wave receiving device detected by the action detection sensor is determined to have changed from the stop state to the another state.

7. The satellite radio wave receiving device according to claim 6,
wherein the one or more controllers are configured to cause the display to:
perform display of acquired information on the current location; and
perform display of the acquired information on the current location and the display related to the interruption notification operation in parallel.

8. An electronic timepiece comprising:
the satellite radio wave receiving device according to claim 1:
the receiver;
the action detection sensor;
the output device; and
a clock circuit configured to count current date and time.

9. A method for controlling a satellite radio wave receiving device comprising a receiver, an action detection sensor and an output device, the method comprising:
continually performing calculation of a current location based on radio waves from positioning satellites received by the receiver;
determining whether an action state of the satellite radio wave receiving device detected by the action detection sensor has changed to a stop state;
in response to determining that the action state of the satellite radio wave receiving device has changed to the stop state, interrupting the calculation of the current location by causing the receiver to interrupt reception of the radio waves;
causing the output device to perform an interruption notification operation for notifying that the calculation of the current location is being interrupted;
determining whether the reception of the radio waves by the receiver is interrupted;
determining whether the receiver is in a lost state in which the receiver has failed to receive radio waves required to calculate the current location;
in response to determining that the reception of the radio waves is not interrupted and that the receiver has failed to receive the radio waves required to calculate the current location, causing the output device to perform a lost-state notification operation for notifying that it is impossible to calculate the current location;
determining whether the action state of the satellite radio wave receiving device detected by the action detection sensor has changed to the stop state during the lost state of the receiver; and
in response to determining that the action state of the satellite radio wave receiving device has changed to the stop state during the lost state of the receiver, interrupting the calculation of the current location by causing the receiver to interrupt reception of the radio waves without causing the output device to perform the interruption notification operation.

10. A non-transitory computer-readable storage medium storing instructions for controlling a satellite radio wave receiving device comprising a receiver, an action detection sensor and an output device, the instructions causing one or more computers to at least:
continually perform calculation of a current location based on radio waves from positioning satellites received by the receiver;
determine whether an action state of the satellite radio wave receiving device detected by the action detection sensor has changed to a stop state;
in response to determining that the action state of the satellite radio wave receiving device has changed to the stop state, interrupt the calculation of the current location by causing the receiver to interrupt reception of the radio waves;
cause the output device to perform an interruption notification operation for notifying that the calculation of the current location is being interrupted;
determine whether the reception of the radio waves by the receiver is interrupted;
determine whether the receiver is in a lost state in which the receiver has failed to receive radio waves required to calculate the current location;
in response to determining that the reception of the radio waves is not interrupted and that the receiver has failed to receive the radio waves required to calculate the current location, cause the output device to perform a lost-state notification operation for notifying that it is impossible to calculate the current location;
determine whether the action state of the satellite radio wave receiving device detected by the action detection sensor has changed to the stop state during the lost state of the receiver; and
in response to determining that the action state of the satellite radio wave receiving device has changed to the stop state during the lost state of the receiver, interrupt the calculation of the current location by causing the receiver to interrupt reception of the radio waves without causing the output device to perform the interruption notification operation.

* * * * *